(12) United States Patent
Roesch

(10) Patent No.: US 6,198,045 B1
(45) Date of Patent: Mar. 6, 2001

(54) METAL-STUD ELECTRICAL BOX

(75) Inventor: Mark A. Roesch, Brecksville, OH (US)

(73) Assignee: The Lamson & Sessions Co., Cleveland, OH (US)

( * ) Notice: Subject to any disclaimer, the term of this patent is extended or adjusted under 35 U.S.C. 154(b) by 0 days.

(21) Appl. No.: 09/336,454

(22) Filed: Jun. 18, 1999

Related U.S. Application Data

(60) Provisional application No. 60/114,620, filed on Jan. 4, 1999.

(51) Int. Cl.$^7$ .................................................. H01R 4/00
(52) U.S. Cl. ................................ 174/58; 220/3.2; 248/906
(58) Field of Search ................................ 174/54, 48, 57, 174/58, 61, 63; 220/3.2, 3.7, 3.8, 3.9, 3.92, 3.94, 4.02; 248/343, 906

(56) References Cited

U.S. PATENT DOCUMENTS

| | | |
|---|---|---|
| D. 190,425 | 5/1961 | Dean . |
| D. 261,135 | 10/1981 | Horne . |
| 1,843,969 | 2/1932 | Blesso . |
| 2,847,140 | 8/1958 | Voss . |
| 3,740,451 * | 6/1973 | Schindler et al. ..................... 174/58 |
| 3,862,351 * | 1/1975 | Schindler et al. ..................... 174/58 |
| 3,926,330 * | 12/1975 | Deming et al. ....................... 220/3.9 |
| 3,972,498 | 8/1976 | Paskert . |
| 4,167,648 | 9/1979 | Lockwood . |
| 4,244,483 | 1/1981 | Bauer et al. . |
| 4,335,271 | 6/1982 | Haslbeck . |
| 4,344,547 | 8/1982 | Moore . |
| 4,436,952 | 3/1984 | Lockwood . |
| 4,972,044 | 11/1990 | Kropa . |
| 5,025,944 | 6/1991 | Rodick . |
| 5,405,111 * | 4/1995 | Medlin, Jr. ......................... 248/205.1 |
| 5,452,873 * | 9/1995 | Laughlin .......................... 248/205.1 |
| 5,600,093 | 2/1997 | Herth et al. . |
| 5,668,350 | 9/1997 | Yanase . |
| 5,677,512 * | 10/1997 | Reiker .................................... 174/58 |
| 5,680,947 * | 10/1997 | Jorgensen .............................. 220/3.9 |
| 5,807,039 * | 9/1998 | Booher et al. ....................... 408/224 |
| 5,810,303 * | 9/1998 | Bourassa et al. ................. 248/205.1 |
| 5,839,594 | 11/1998 | Barbour . |

OTHER PUBLICATIONS

"Two Gang—Residential Switch or Receptacle Box", Allied Moulded Products, Inc. (p. 14). No Date.
"Slater® Plastic Boxes—Screw Mount Steel Stud Boxes", Pass & Seymour legrand (p. 12). No Date.
Brochure: "Zip Box® Blue™—Nonmetallic Switch and Outlet Boxes", ©Lamson & Sessions 1996. No Date.
"An Introduction To Tapping Screws", IFI, 1981 (pp. H–1 to H–2; H–12). No Date.
"Slotted And Cross Recessed Head Tapping Screws", Abstract of ANSI/ASME B18.6.4 (1981). No Date.
Schedule A: Measurements made by the inventor. No Date & Year.

* cited by examiner

*Primary Examiner*—Kristine Kincaid
*Assistant Examiner*—Dhiru R Patel
(74) *Attorney, Agent, or Firm*—Jones, Day, Reavis & Pogue

(57) ABSTRACT

The invention relates to the use of drill-pointed screws to attach electrical boxes to heavy gauge metal studs. The drill-pointed screws of the invention are at least two inches long and have a length to thread diameter ratio of at least 12 to 1. The electrical boxes of the invention have brackets that form a relatively steep angle to the stud, such a steep angle having proven necessary to get the drill-pointed screws to penetrate the metal. The electrical boxes may also include a second set of brackets that angle more shallow angle with the stud surface and are more suitable for use with nails. The electrical boxes are preferable made of extra-thick relatively shatter resistant engineered plastic and are preferably formed so that they can be vertically stacked in a nested fashion.

8 Claims, 6 Drawing Sheets

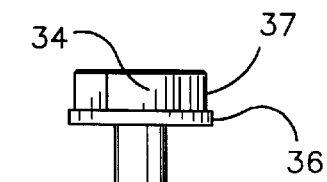
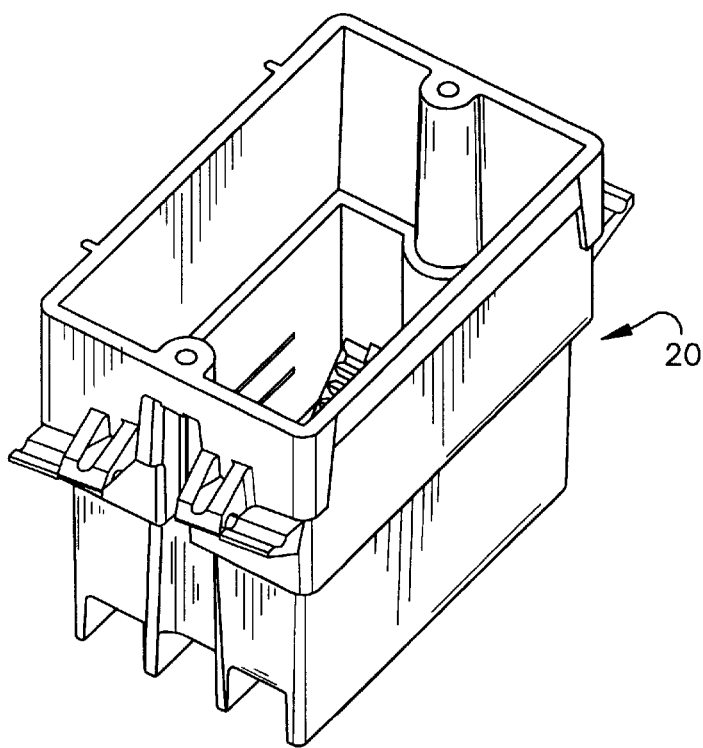
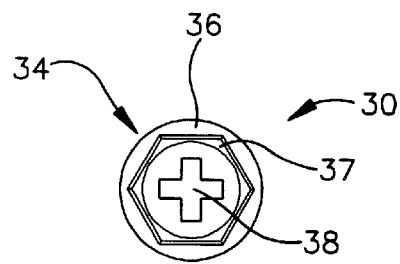

METAL-STUD ELECTRICAL BOX

This Appln. claims the benefit of Provisional No. 60/114,620 filed Jan. 4, 1999.

FIELD OF THE INVENTION

This invention relates to electrical boxes and means and methods for mounting them on metal studs.

BACKGROUND OF THE INVENTION

During housing construction, many electrical boxes are typically mounted on wall studs to accommodate electrical equipment such as outlets and switches. In the last decade, it has become increasingly common for these wall studs to be made of a metal, especially steel. Mounting an electrical box on a metal stud can be difficult and the time required to mount all the electrical boxes called for in a construction project can be substantial.

Prior art electrical boxes have been designed for mounting on wooden studs by means of nails or screws. These boxes are usually provided with external mounting brackets on their tops and bottoms. Generally, the brackets are angled away from the boxes to provide space for the operation of a hammer, screwdriver, or drill. This is particularly important when the electrical box is of the longer multi-gang type. The mounting brackets are also commonly angled toward the front of the box to further facilitate access to them during installation.

While these prior art electrical boxes can be mounted to very light gauge metal studs by means of nails or screws, they cannot be so mounted to heavier gauge metal studs such as load-bearing studs. Heavier gauge metals are not penetrated by ordinary nails and screws. Clamps have been used as an alternative mounting means. Mounting with clamps, however, is cumbersome and slow in comparison to mounting by nails or screws.

SUMMARY OF THE INVENTION

An object of the present invention is to provide an electrical box and mounting means that satisfies the demands of modern housing construction, including the need for electrical boxes that attach to metal studs. Such a mounting means is a drill-pointed screw.

When the electrical box mounting brackets guide the screws at an angle that is too far from perpendicular to a steel stud and the steel is of gauge 18 or thicker, and particularly if the steel is of gauge 16 or thicker, the drill-pointed screws will dance and slip across the surface of the steel without effectively penetrating it. For there to be effective penetration of the steel, the screw must be directed at an angle that is no more than about 14 degrees from perpendicular to the stud surface. Therefore, one aspect of the invention is an electrical box with external mounting brackets that guide fasteners into a stud at an angle within about 14 degrees of the perpendicular.

For electrical boxes generally, and for multi-gang electrical boxes in particular, it was unexpected that there would be an angle at which a fastener guide would allow ready access for an installation tool while being steep enough for a drill-pointed screw to penetrate the metal. For all electrical boxes, angling the fastener guides away from the box facilitates the operation of installation tools. For multi-gang electrical boxes this angle must be particularly steep. Whereas for single gang electrical boxes the space on the stud opposing side of the electrical box can be of use for the operation of a hammer, screwdriver or drill, particularly when an extra-long fastener is used, for multi-gang electrical boxes this space is of no use at all.

An angle of about 14 degrees from the perpendicular is too shallow to allow ready mounting of an electrical box with a hammer and nails. Thus, the new electrical boxes could potentially present a contractor with the necessity of stocking two types of electrical boxes, one for use with nails and the other for use with drill-pointed screws. To avoid this inconvenience, a preferred embodiment of the invention has two sets of fastener guides, one for nails, the other for drill-pointed screws. The nail guides form angles that are 20 degrees or more from the perpendicular.

The drill-pointed screws of the present invention are also new. These drill-pointed screws have a greater length to major thread diameter ratio than prior art drill-pointed screws, the screws of the invention have a length of 1.5 to 3.25 inches, a major thread diameter between 0.110 and 0.160 inches, and a length to major thread diameter ratio of at least 12 to one. The drill bit point is generally no more than about 0.25 inches long and the threaded portion is generally at least 1 inch long.

An electrical box with brackets accommodating two sets of fastener guides tends to be somewhat voluminous. To compensate for this disadvantage, a further aspect of this invention is an electrical box that is shaped to allow nested stacking. This feature reduces shipping costs, eases the handling of large quantities of boxes, and is convenient for contractors and end users.

When a conventional electrical box made of a relatively shatter resistant engineered plastic is firmly attached to a heavy gauge metal stud by means such as a drill-pointed screw, the walls of the box, which are ordinarily about 0.08 inches thick, have a tendency to bow. Therefore, another aspect of the invention is an electrical box made of a relatively shatter resistant plastic having walls that are thicker than those of prior art relatively shatter resistant electrical boxes, the boxes of the present invention have wall thicknesses of about 0.10 inches, preferably about 0.12 inches.

Another aspect of the invention is a method for mounting an electrical box to a metal stud that comprises mounting the electrical box using drill-pointed screws, preferably with the drill-pointed screws entering the stud at an angle of about 14 degrees from the perpendicular.

BRIEF DESCRIPTION OF THE DRAWINGS

FIG. 7 is an oblique view of a single gang electrical box of the present invention.

FIG. 10 is a side view of a drill-pointed screw of the present invention.

FIG. 11 is an end view of the drill-pointed screw of FIG. 10.

DETAILED DESCRIPTION OF THE INVENTION

Figure 1:
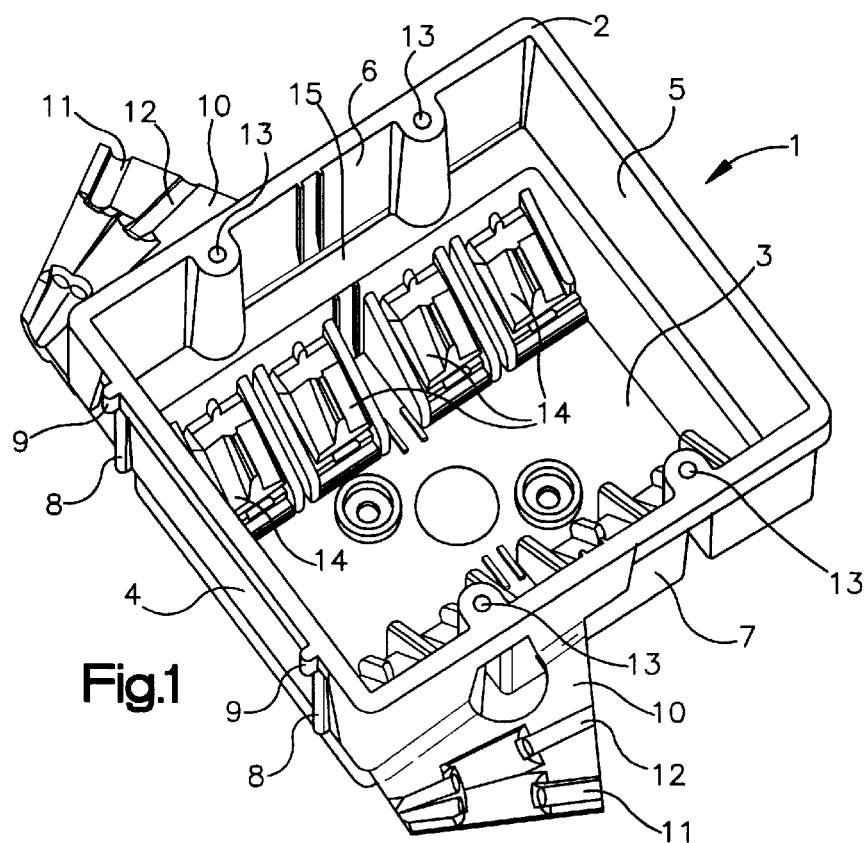
FIG. 1 is an oblique view of a two gang electrical box of the present invention.

FIGS. 1 through 4 show a two gang electrical box of the present invention. Referring to FIG. 1, the two gang electrical box 1 has a front 2, a back 3, and four sides, which are a stud facing side 4, a distal side 5, a top side 6, and a bottom side 7. The front is open to allow access to the interior of the box. The stud facing side 4 has projections 8 and 9 that fix the position of the box relative to a stud when stud facing side 4 is placed against a flat stud surface. Projections 8 are intended to rest against a stud surface to which the box is to be attached Projections 9 are intended to lie over the front edge of the stud and to fix the position of the front of the box so that it lines up with a sheet of drywall subsequently placed over the stud. When the box is mounted on the right side of a vertically oriented stud, the top side 6 will be above the bottom side 7, although the situation would be reversed if the box were mounted on the left side of the stud.

The top 6 and the bottom 7 each have mounting bracket frames 10. Each of these mounting bracket frames has a nail guide 11 and a screw guide 12. When projections 8 are resting against the surface of a stud, fasteners mounted in these guides will make determinate angles with an imaginary line that is perpendicular to the stud surface. Whether or not a box is provided with projections 8, this position in which these angles are determined is the position of the box relative to the stud when the stud facing side of the box is pressed up against the stud. This position fixes the angle made by the fastener guides with the stud surface. The angle that the guides make with the stud surface while the box is in this position, which angle can be measured in terms of degrees from the perpendicular, determines whether the fasteners will effectively penetrate the stud, at least in the case of a drill-pointed screw and a heavy gauge metal stud.

Figure 2:
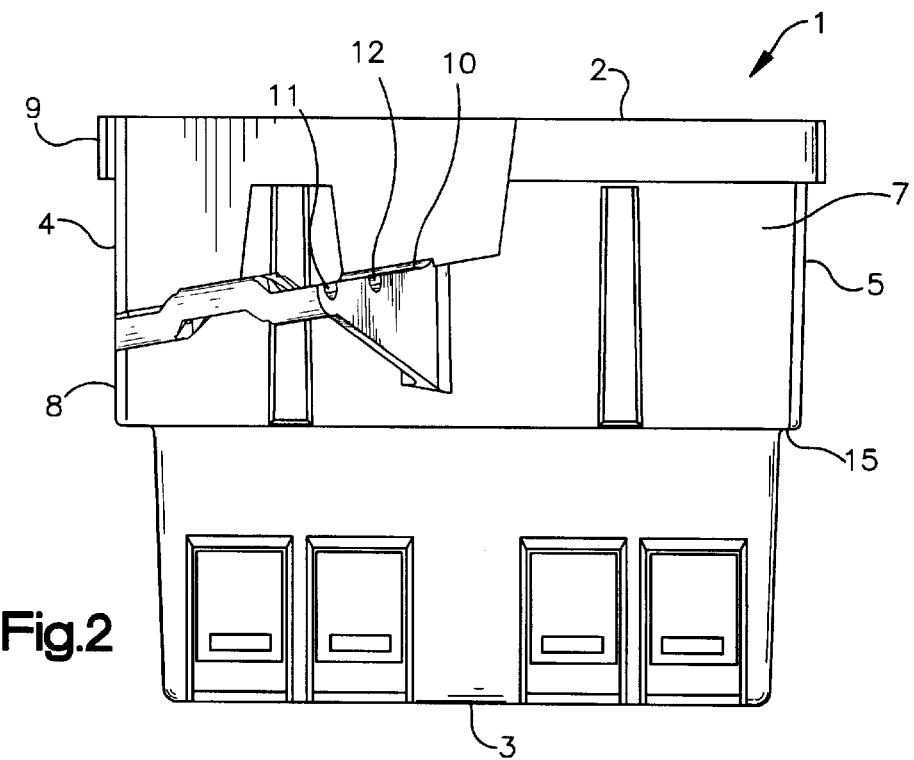
FIG. 2 is a bottom view of the electrical box of FIG. 1.
Figure 3:
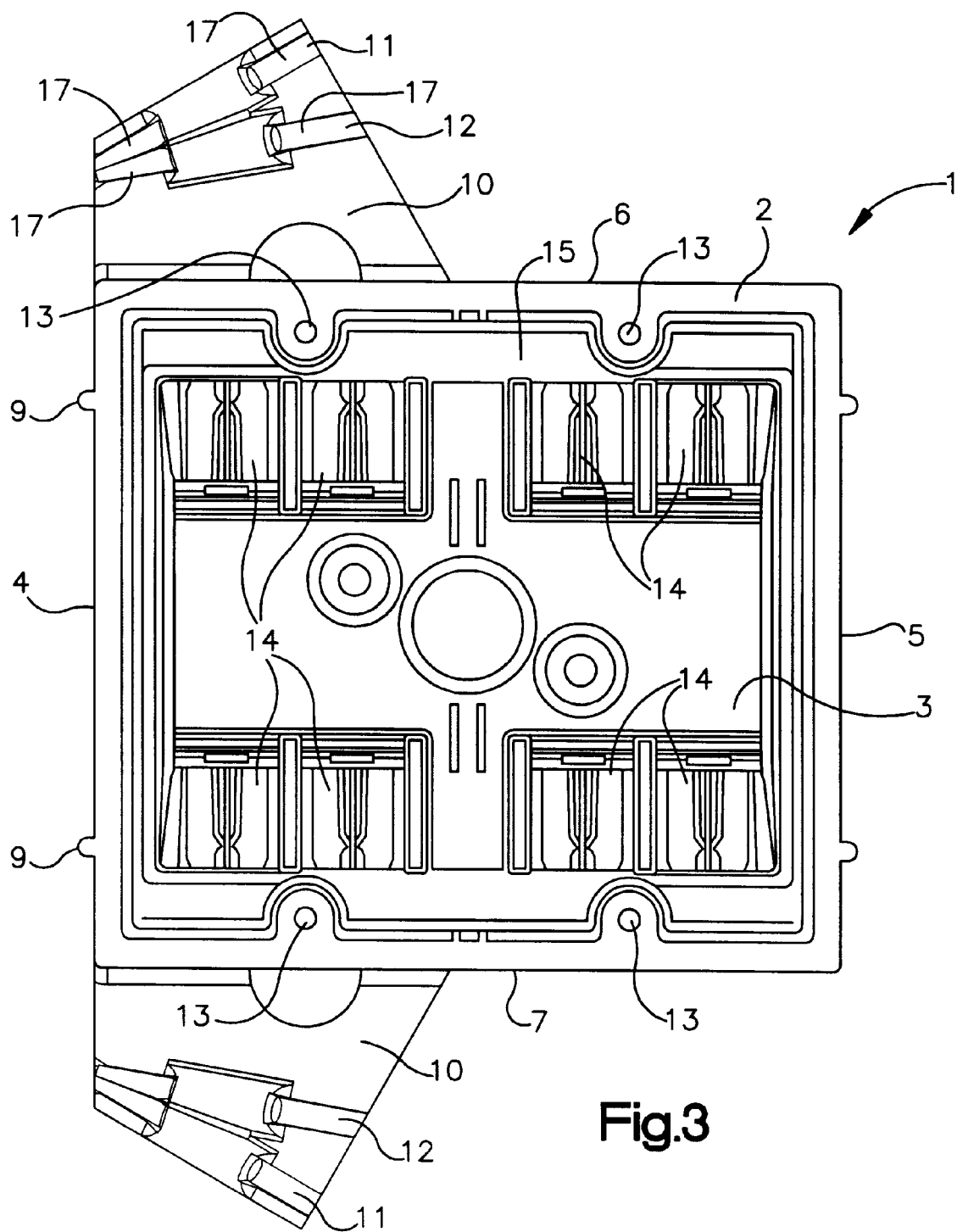
FIG. 3 is a front view of the electrical box of FIG. 1.

As shown in FIG. 2, fastener guides 11 and 12 angle towards the front of the box 2 at an angle of 10 degrees as they extend away from the stud facing side 4. As shown in FIG. 3, fastener guides 11 and 12 also angle away from the top 6 and bottom 7 sides of the box as they extend from the stud facing side 4. If the box is mounted on the side of a vertical positioned stud, the screw guides make an angle of 10 degrees with the horizontal whereas the nail guides make an angle of 30 degrees. These angles make it easier to install the fasteners when the box is being mounted within a wall.

Another way of describing the angles made by the fastener guides, or equivalently, the angles made by fasteners mounted in the fastener guides, is in terms of projections. When the stud facing side 4 of the box 1 is pressed up against a stud, the front of the box 2 lies in a plane perpendicular to the plane of the stud surface. When the angles the fastener guides make with a perpendicular to the stud surface are projected onto the plane of the front of the box, these angles are 10 degrees for the screw guides and 30 degrees for the nail guides, as shown in FIG. 3. When the angles the fastener guides make with a perpendicular to the stud surface are projected onto a plane that is perpendicular to both the stud surface and the plane of the front of the box, the projected angles are all 10 degrees, as shown in FIG. 2.

Being angled 10 degrees away from the horizontal and 10 degrees towards the front of the box, the screw guides make a total angle which is about 14 degrees from perpendicular to the stud surface. Once again, these angles are measured relative to a flat stud surface and assuming the box is positioned properly with its stud facing side pressed against that surface.

Figure 4:
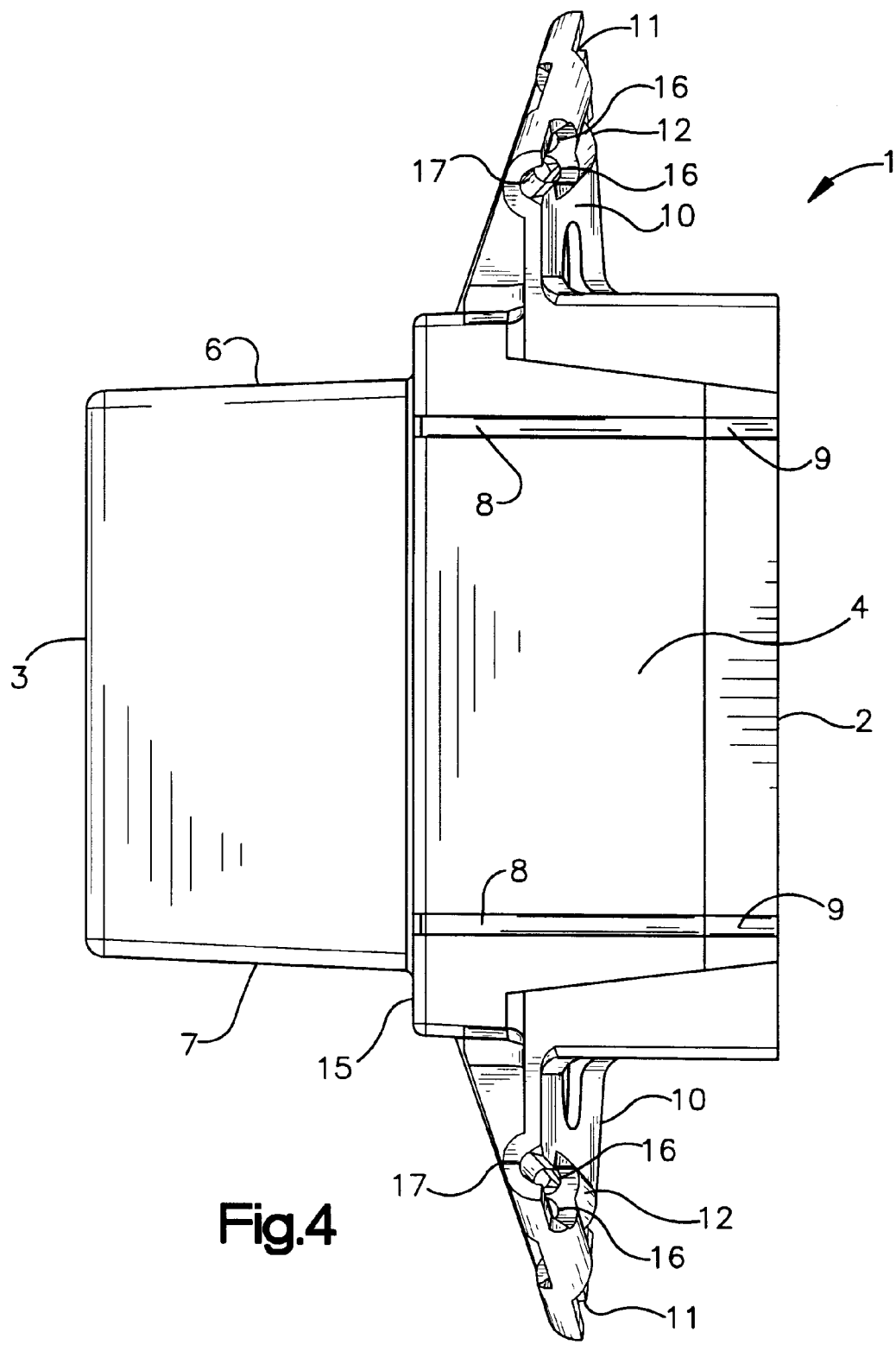
FIG. 4 is a view of the electrical box of FIG. 1 from the stud facing side.

As shown in FIG. 4, fastener guides 11 and 12 are made up of top surfaces 16 and opposing bottom surfaces 17. This arrangement holds a fastener firmly in position without unduly hindering its installation.

As can be seen in FIGS. 1, 2, and 4, each of the sides 4, 5, 6, and 7 jogs towards the interior of the box at a point 15 that is approximately midway between the front of the box 2 and the back 3. Sides 4 and 5 jog in by a distance that is slightly greater than the thickness of the sides. Sides 6 and 7 jog in by a greater distance, which is slightly greater than the thickness of these sides at the points where they bulge inward to accommodate electrical device mounting holes 13. These jogs allows identical boxes 1 to be stacked in a vertically nested fashion. That is, the back 3 of one box 1 can be slid thorough the front 2 of another identical box to a distance that is approximately half way to the back 3. Placing the jog approximately midway between the front of the box and the back provides the greatest benefit, although a significant benefit would still be achieved if the offset occurred only about one quarter of the way from the front to the back.

The sides of the box may be otherwise shaped to accommodate nested stacking. The sides of the box may angle steadily inward along the distance from the front of the box to the back of the box. The lower portions of the box may be provided with indentations to accommodate corresponding inward bulges in the upper portions of the box, such as bulges created to accommodate electrical device mounting holes.

Electrical boxes shaped to accommodate nested stacking may be produced in families having various numbers of gangs. Within such a family, each electrical box can be nested within any other electrical box having an equal or lesser number of gangs, As shown in FIG. 3, the box 1 has eight flexible cable clamps 14. Electrical cables can be slid into the box through these clamps. Once the cables are installed, the clamps hold the cables securely in place.

Figure 5:
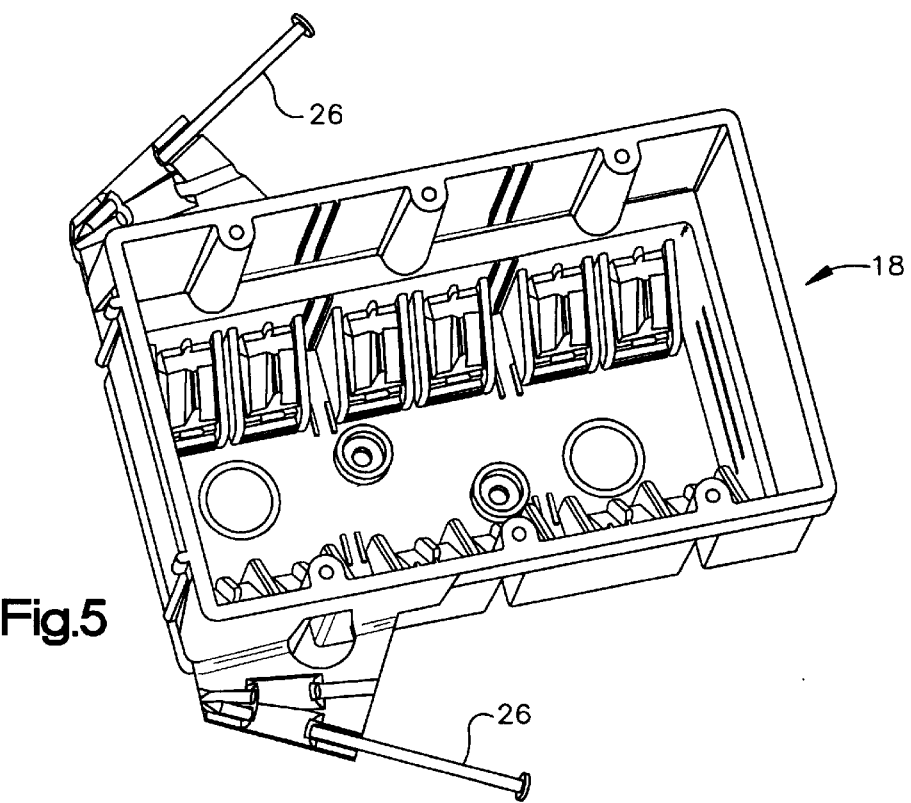
FIG. 5 is an oblique view of a three gang electrical box of the present invention with pre-installed nails.
Figure 6:
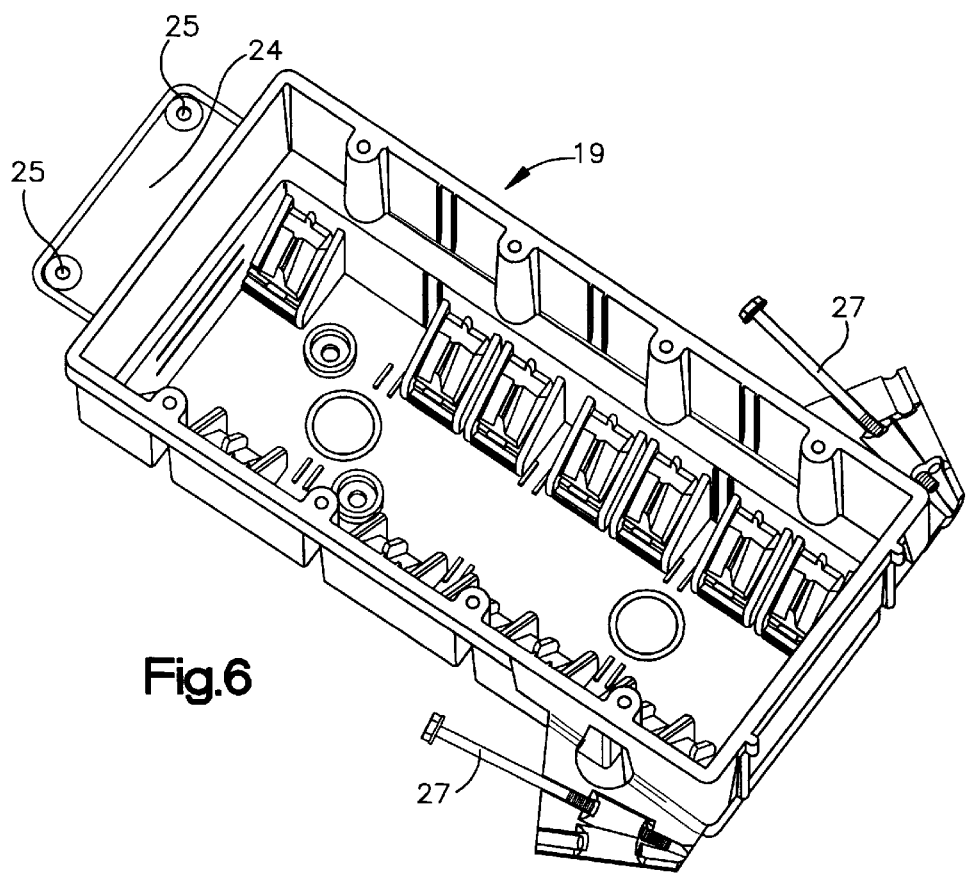
FIG. 6 is an oblique view of a four gang electrical box of the present invention with pre-installed drill-pointed screws.

The box 1 has two pairs of electrical device mounting holes 13, making it a two-gang electrical box. Fixtures, such as light switches and electrical receptacles, can be mounted in the box by means of these holes. Although the invention has thus far been described with reference to the two gang electrical box 1, it encompasses electrical boxes with any number of gangs. FIG. 5 shows a three gang electrical box 18 of the present invention. FIG. 6 shows a four gang electrical box 19 of the present invention. FIG. 7 shows a single gang electrical box 20 of the present invention.

Figure 8:
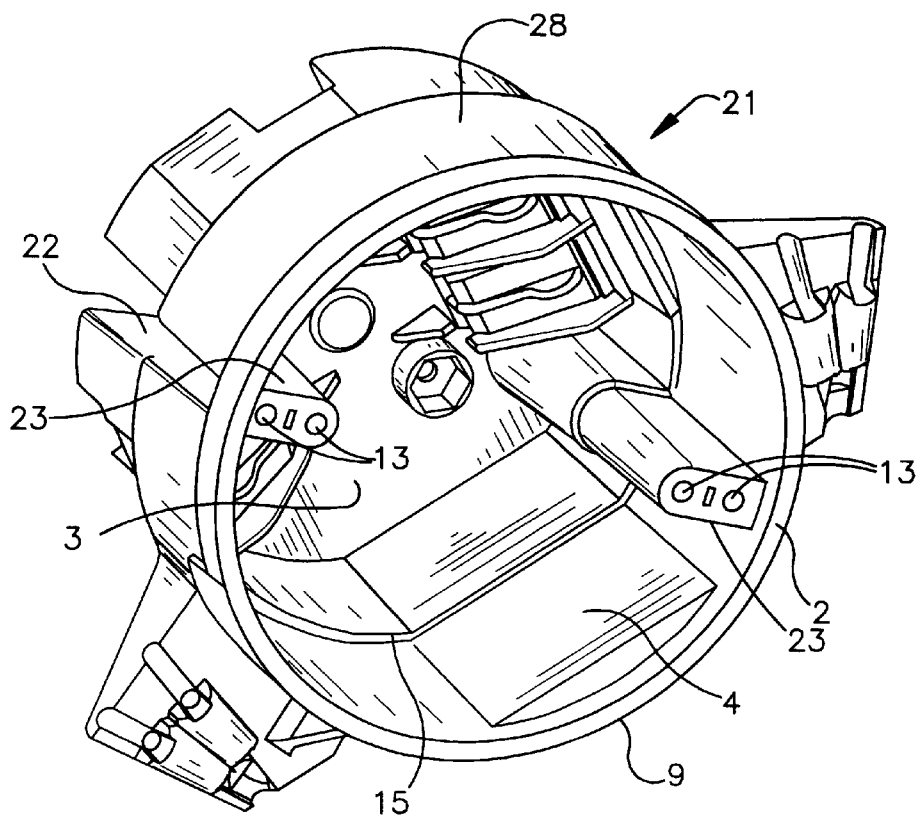
FIG. 8 is an oblique view of a ceiling electrical box of the present invention.
Figure 9:
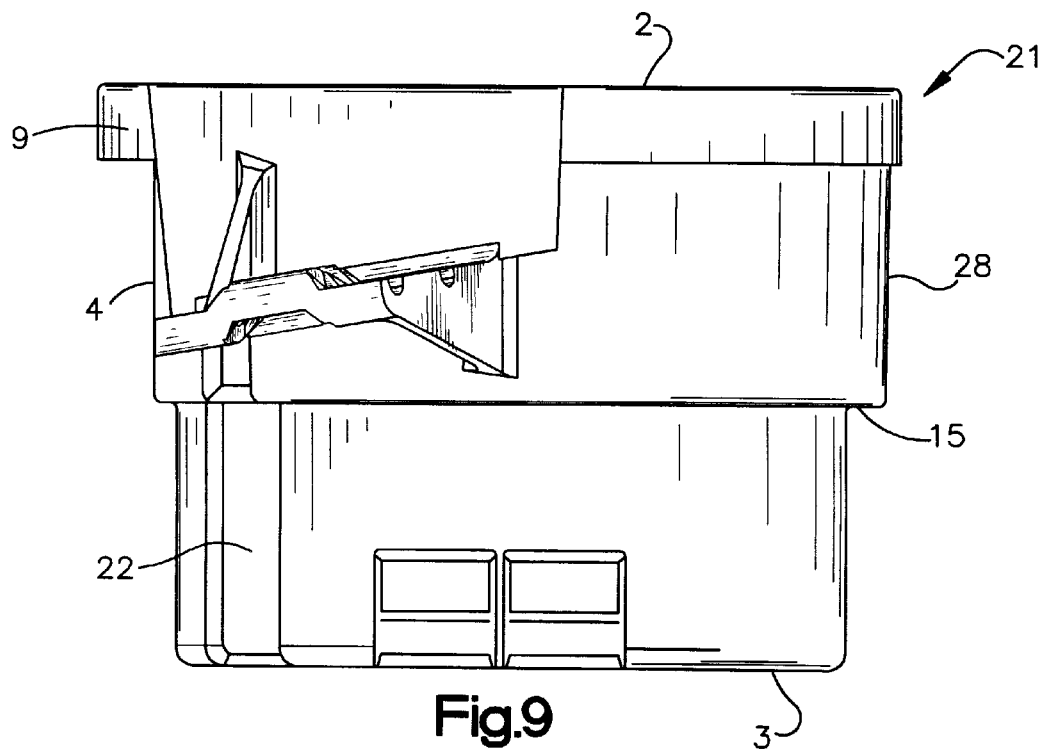
FIG. 9 is a side view of ceiling box of FIG. 8, the view being from a side that is perpendicular to both the stud-facing side and the front.

Ceiling boxes can also be made in accordance with the present invention. FIGS. 8 and 9 show a ceiling box 21. It has a front 2, a back 3, and a stud facing side 4, and a rounded side 28. The stud facing side has a projection 9 that fits over the edge of a stud when side 4 is pressed up against the stud. Although box 21 has four electrical device mounting holes 13, it is not considered a multi-gang electrical box. Box 21 has indentations 22 in the lower portions of its rounded side 28. These indentations facilitate vertical stacking and correspond to bulges 23 in the upper portions of the box's rounded side 28, which bulges accommodate the electrical device mounting holes 13.

The boxes 1, 18, 19, 20, and 21 are single piece, injection molded, and made of a relatively shatter resistant engineered plastic. Thermoplastics, such as polycarbonate, polyvinylchloride, and Valox™ are considered relatively shatter resistant engineered plastics. Thermoset plastics, such as phenolic resin and polyester resin plastics, on the other hand, are not considered relatively shatter resistant.

FIGS. 10 and 11 show a drill-pointed screw 30 of the present invention. The screw has a drill bit portion 31, a threaded portion 32, a shaft portion 33, and a head portion 34. The drill bit portion 31 and the shaft portion 33 each have a diameter of 0.108 inches. The major diameter of the threads of the threaded portion 32 is slightly greater, being 0.133 inches. The pointed end 35 of the drill bit portion 31 forms an angle of 59 degrees with the axis of the screw. The drill bit portion 31 is 0.19 inches long. The threaded portion 32 is 1.06 inches long and has 20 threads per inch. The shaft portion 33 is 1.38 inches long. The total length of the screw 30 is 2.75 inches.

The head portion 34 comprises a washer portion 36 and a hex nut portion 37. The washer portion is 0.285 inches in diameter and 0.020 inches thick. The hex nut is of the 0.250 inch type. The head portion 34 is also provided with Phillips No. 2 slots 38.

Drill-pointed screws have one or more sharp cutting edges on their drill bit ends that function to cut away material from the surface the screw is being driven into. The hole thus created has a diameter that is less than the major thread diameter. When the threads enter the hole created by the drill bit point, they cut or form a matching thread in the sides of the hole. Examples of drill-pointed screws are given in SAE (Society of Automotive Engineers) J78, pages H-69 thru 76, in Fastener Standard (6th ed. 1988), the entire volume of which is incorporated herein by reference.

As an added convenience to the user, it may be advantageous to pre-install fasteners within the fastener guides. FIG. 5 shows a three gang electrical box with pre-installed nails 26. FIG. 6 shows a four gang electrical box with pre-installed screws 27. The four gang electrical box of FIG. 9 has a flange 24 distal from the box's stud facing side. The flange 24 is penetrated by two holes 25 for receiving fasteners. This flange is designed to rest against and attach to a short piece of stud and thus facilitate the alignment of the box with a sheet of dry wall installed over and around the box.

As an added convenience to the user, it may be advantageous to pre-install fasteners within the fastener guides. FIG. 8 shows a three gang electrical box with pre-installed nails 26. FIG. 9 shows a four gang electrical box with pre-installed screws 27. The four gang electrical box of FIG. 9 has a flange 24 distal from the box's stud facing side. The flange 24 is penetrated by two holes 25 for receiving fasteners. This flange is designed to rest against and attach to a short piece of stud and thus facilitate the alignment of the box with a sheet of dry wall installed over and around the box.

I claim:

1. An electrical box assembly comprising:
   a back, a front, sides, and an inside;
   said front having an opening;
   said sides being shaped so that when two identical copies of said electrical box are placed facing in the same direction and with said back of one directly above said back of the other of said two identical copies of said electrical box, the one of said two identical copies of said electrical box may be slid back first within said opening in said front of the other of said two identical copies of said electrical box so that said back of the one of said two identical copies of said electrical box can be placed entirely inside the other of said two identical copies of said electrical box.

2. An electrical box assembly as in claim 1 such that said one electrical box may be slid into said other electrical box to bring said back of said one electrical box to a distance from said back of said other electrical box that is one quarter of the distance from said front of said other electrical box to said back of said other electrical box.

3. An electrical box assembly as in claim 1 such that said one electrical box may be slid into said other electrical box to bring said back of said one electrical box to a distance from said back of said other electrical box is half the distance from said front of said other electrical box to said back of said other electrical box.

4. Electrical boxes assembly comprising:
   at least two electrical boxes having various numbers of gangs, each of said electrical boxes having a back, a front, sides, and an inside;
   each of said fronts having an opening;
   said sides of said electrical boxes being shaped so that when any two of said electrical boxes within said family are placed facing in the same direction and with said back of one of said two electrical boxes directly above said back of the other of said two electrical boxes, said one of said two electrical boxes may be slid back first within the opening of the front of said other of said two electrical boxes so that said back of said one of said two electrical boxes can be placed entirely inside said other of said two electrical boxes.

5. Electrical boxes assembly as in claim 4 wherein said one of said two electrical boxes may be slid into said other of said two electrical boxes to bring said back of said one of said two electrical boxes to a distance from said back of said other of said two electrical boxes that is one quarter of the distance from said front to said back of said other of said two electrical boxes.

6. An electrical box comprising:
   a stud facing side;
   external mounting brackets; and
   first and second fastener guides formed within said mounting brackets;
   said first and second fastener guides being shaped to direct fasteners into a stud surface at respective first and second angles relative to the stud surface when said stud facing side is pressed up against the stud surface;
   said first angle being greater than said second angle.

7. An electrical box as in claim 6 wherein said second angle is not more than 14 degrees and said first angle is not less than 20 degrees.

8. An electrical box as in claim 6 wherein said first and second fastener guides are both formed within a single one of said external mounting brackets.

* * * * *